(12) United States Patent
Tournier et al.

(10) Patent No.: US 7,056,162 B2
(45) Date of Patent: Jun. 6, 2006

(54) ANTI-LOOSENING DEVICE FOR SCREW OR NUT

(75) Inventors: Gilles Tournier, Leguevin (FR); Stéphanie Klepka, Saint Orens (FR)

(73) Assignee: Aribus France, Toulouse (FR)

( * ) Notice: Subject to any disclaimer, the term of this patent is extended or adjusted under 35 U.S.C. 154(b) by 0 days.

(21) Appl. No.: 11/010,194

(22) Filed: Dec. 10, 2004

(65) Prior Publication Data

US 2005/0136750 A1 Jun. 23, 2005

(30) Foreign Application Priority Data

Dec. 16, 2003 (FR) .................................. 03 14724

(51) Int. Cl.
*H01R 4/30* (2006.01)
(52) U.S. Cl. ..................................... 439/801; 439/883
(58) Field of Classification Search ............... 439/801, 439/807, 813; 411/144, 114, 91, 321, 175, 411/27; 429/178, 179, 121
See application file for complete search history.

(56) References Cited

U.S. PATENT DOCUMENTS

| | | | | |
|---|---|---|---|---|
| 1,874,593 A | * | 8/1932 | Olson | 439/883 |
| 2,771,113 A | * | 11/1956 | Flora | 411/167 |
| 4,174,148 A | * | 11/1979 | Obuch et al. | 439/782 |
| 4,787,791 A | * | 11/1988 | Lambousy et al. | 411/124 |
| 4,820,235 A | * | 4/1989 | Weber et al. | 411/188 |
| 5,080,545 A | * | 1/1992 | McKinlay | 411/149 |
| 5,090,855 A | * | 2/1992 | Terry | 411/144 |
| 5,487,685 A | * | 1/1996 | Stillback et al. | 439/801 |
| 5,584,726 A | * | 12/1996 | Le Gallic et al. | 439/573 |
| 5,759,055 A | * | 6/1998 | Colantuano et al. | 439/883 |
| RE35,937 E | * | 10/1998 | DiStasio | 411/329 |
| 6,010,289 A | * | 1/2000 | DiStasio et al. | 411/174 |
| 6,206,737 B1 | * | 3/2001 | Bonilla et al. | 439/801 |
| 6,227,782 B1 | * | 5/2001 | Bowling et al. | 411/114 |
| 6,264,411 B1 | * | 7/2001 | DiStasio et al. | 411/329 |
| 6,336,779 B1 | * | 1/2002 | Jakob et al. | 411/175 |
| 6,361,384 B1 | * | 3/2002 | Manor et al. | 439/883 |
| 6,368,039 B1 | * | 4/2002 | Wolfe et al. | 411/526 |
| 6,499,923 B1 | * | 12/2002 | LeVey | 411/172 |
| 6,776,565 B1 | * | 8/2004 | Chang | 411/136 |

FOREIGN PATENT DOCUMENTS

| | | |
|---|---|---|
| DE | 1 961 792 | 6/1971 |
| GB | 142 754 | 5/1920 |
| JP | 09092355 | 4/1997 |

* cited by examiner

*Primary Examiner*—Briggitte R. Hammond
(74) *Attorney, Agent, or Firm*—Patterson, Thuente, Skaar & Christensen, P.A.

(57) ABSTRACT

An anti-loosening device for locking the head of a locking screw or nut, in particular for connection of an electrical terminal to a contact lug, wherein the device essentially comprises a plate having at least one catch element rotationally stationary in relation to the contact lug when the locking means are being fastened, and comprising a toothed element interlocking at the end of the screwing process with the catch element to resist unscrewing of the locking screw or nut.

9 Claims, 2 Drawing Sheets

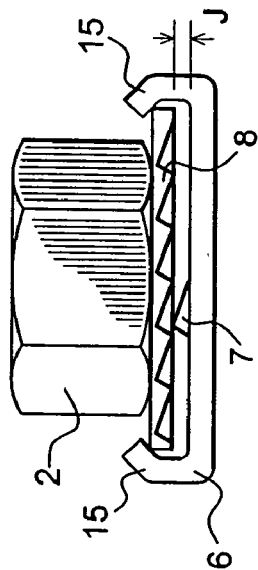
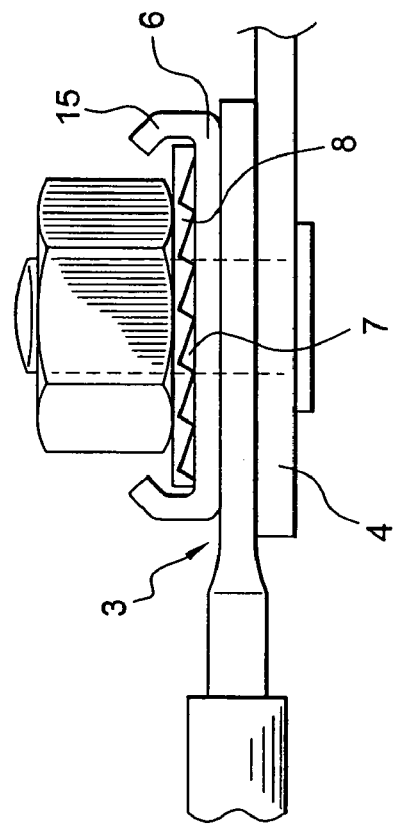
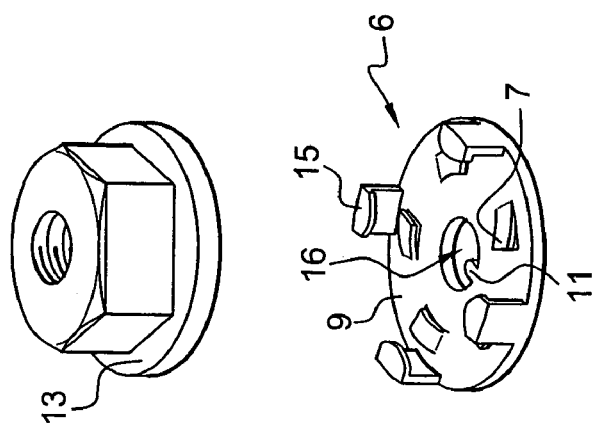
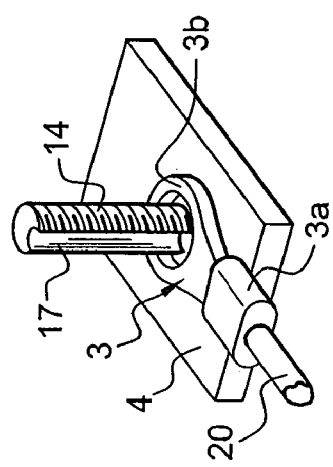

ANTI-LOOSENING DEVICE FOR SCREW OR NUT

RELATED APPLICATION

The present application claims priority to French Application No. 03 14724 filed Dec. 16, 2003.

TECHNICAL FIELD

This invention relates to a device that counters the loosening of a screw or nut, in particular a locking screw for an electrical terminal on a contact lug of a connection element. The terminals are in particular electrical cable-end terminals that are generally crimped onto the wires to be connected.

BACKGROUND ART

The electrical connection of terminals on electrical equipment, such as circuit breakers used in particular in aeronautics, is usually accomplished using ring terminals having a hole in the center, these terminals being joined to contact lugs using devices such as locking screws having a threaded part screwing either directly into the lugs or into an inserted nut that is part of the contact lug or, for example, threaded shanks that are part of the lugs, on top of which a locking nut will be fastened.

In both cases, the terminals have the threaded part going through them and affixed to the contact lugs. These systems allow a good connection, but there is a risk that the screws or nuts will loosen due to vibrations or handling of cables proximate to the terminals.

SUMMARY OF THE INVENTION

This invention is an improvement on devices for joining terminals to contact lugs, in particular proposing a connection device that resists the loosening of locking screws or nuts.

To accomplish the objective, this invention relates primarily to a device for connection of an electrical terminal to a contact lug having an anti-loosening device for locking members such as the head of a locking screw or nut, the anti-loosening device essentially comprising a plate having at least one catch situated between the locking member and the terminal and rotationally stationary in relation to the contact lug when the locking member is fastened, the latter having a tooth element that interlocks with said catch element at the end of the screwing process to resist unscrewing of the locking member.

The plate could, in particular, have a base for receiving the locking member, have a bore for receiving a threaded part and at least one stop for preventing rotation of the plate in relation to the contact lug.

Advantageously, the tooth element is fashioned on a collar of the locking member.

According to one embodiment of the invention, the stop comprises a lateral lower flange of the insert.

The catch element could comprise in particular a nib on an upper lateral flange of the insert.

In another embodiment of the invention, the plate could be in the form of a washer, the locking means could be a nut screwing onto a threaded shank that is part of the contact lug.

The washer could advantageously have anchoring arms catching on a shoulder of a nut collar.

The catch element could comprise, in particular, a spring tab cut out from the washer and folded in the direction of some teeth fashioned in a lower surface of the nut, the central bore having a polarization tooth working with a groove of the threaded shank to form a stop preventing the washer from rotating on the threaded shank.

Other features and advantages of the invention will be clearer from the descriptions below of non-restrictive forms of executing the invention with reference to the figures, which show:

BRIEF DESCRIPTION OF THE DRAWINGS

FIG. 3 is an exploded view of a second embodiment of the device in accordance with the invention;

FIG. 4 is a side elevational view of the device shown in FIG. 3; and

FIG. 5 is a side elevational view of the device in FIG. 3 installed.

DETAILED DESCRIPTION OF THE INVENTION

Figure 1:
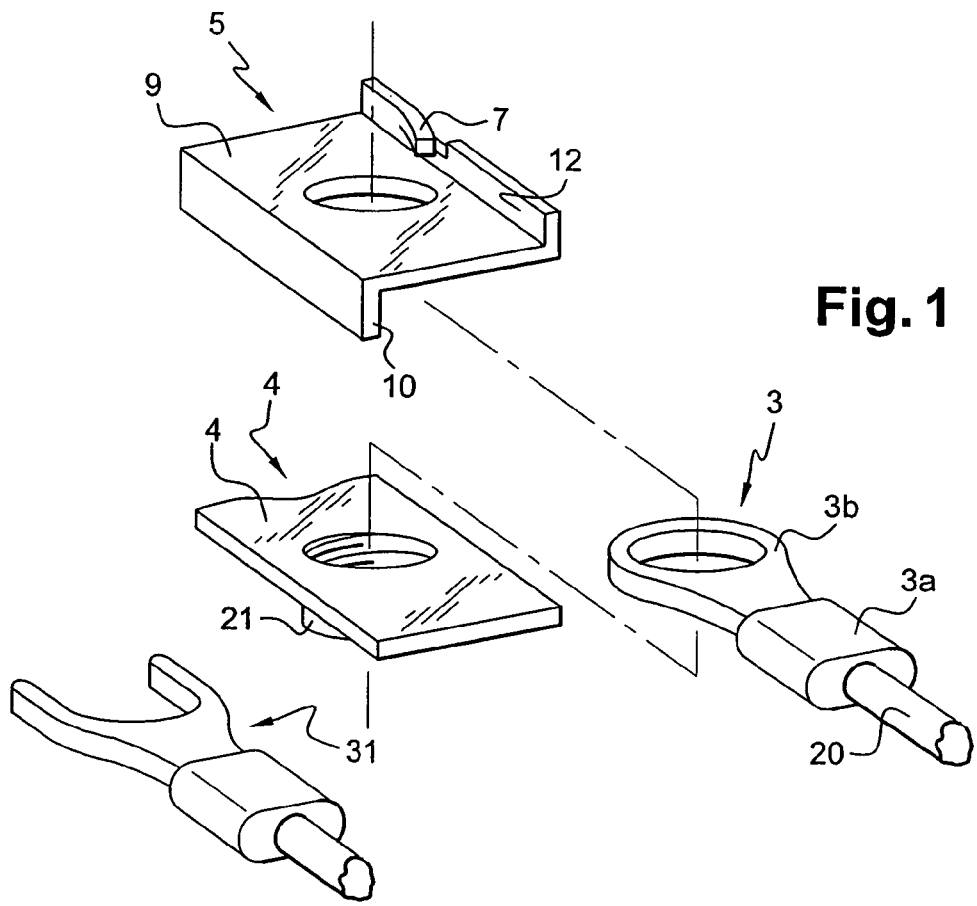
FIG. 1 is an exploded view of a first embodiment of the device in accordance with the invention.

The object of the device per the invention is to resist the loosening of an electrical connection terminal 3 from an electrical contact lug 4.

The terminals 3 used in particular to join electrical circuit breakers with cables 20 are generally terminals having a section 3a connecting to cable 20, in particular by crimping on the core of the cable and including a connecting section 3b, which joins by screwing onto a connection lug 4 of the device to be connected.

According to the example shown in FIGS. 1 and 3, section 3b is fashioned with a metal ring, which is placed around the threaded shaft of a screw 1 or a threaded shank 14, but the invention is also applicable to fork terminals 31.

The electrical connection for this type of terminal is accomplished, in the case of the embodiment shown in FIG. 1, by the lower surface of the connecting section being pressed into lug 4 by means of screwing, such as the head of a screw 1 screwing onto the lug or into an inserted nut 21, which is part of the lug 4, or even, as shown in the example given in FIGS. 3 through 5, using a nut 2 screwing onto a threaded shank 14, which is part of lug 4.

Thus the screw member rests on terminal 1 and presses it onto lug 4.

A mode of connection such as this one offers excellent electrical contact due to the contact pressure applied, but has a risk of loosening in the presence of vibrations or as the consequence of lateral traction on cable 20, which may lead to gradual increase of the contact resistance between the terminal and the lug, causing heating when a current goes through it. This further deteriorates the contact resistance and leads, by cumulative effect, not just to breakage of the connection, but also to destruction of the terminal and/or the contact lug.

The invention as depicted in the examples remedies this problem by resisting loosening of the contact means by placement of a plate 5, 6 between the screw 1 or nut 2 and the terminal 3, this plate having at least one catch element 7, rotationally stationary in relation to contact lug 4 at the time the screw 1 or nut 2 is fastened, the locking element for its part comprising a tooth element 8 working with the catch element to resist loosening of the screw 1 or nut 2 at the end of the fastening process.

To complete immobilization of the locking means, the plate 5, 6 also comprises at least one stop 10, 11 preventing the plate from rotating in relation to the contact lug 4.

Figure 2:
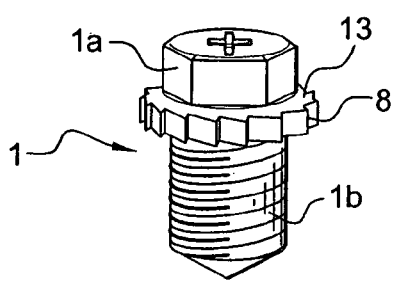
FIG. 2 is a perspective view of the device in FIG. 1, being installed.
Figure 2:
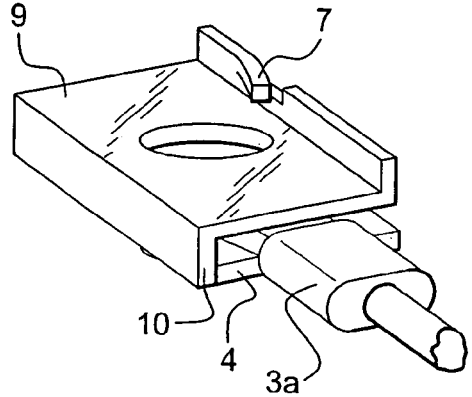

According to the example in FIGS. 1 and 2, the plate is an essentially rectangularly shaped element having a hole which accommodates a locking screw 1 and is positioned on terminal 3, also including a stop preventing rotation in relation to lug 4, said stop comprising a lower lateral flange 10 of the plate 5 and for which the catch element 7 comprises a nib on an upper lateral flange 12 of the insert.

Installation is done as follows, and an intermediate position is shown in FIG. 2.

The plate 5 positioned on terminal 3 is pressed onto lug 4, the screw 1 is inserted in the insert-terminal assembly, then screwed by its threaded part lb into cap nut 21 which is part of lug 4. When the screw is being fastened, the lower lateral flange 10 is positioned along the lug to immobilize the rotating plate and the catch 7 engages with tooth 8 fashioned at the periphery of a collar 13 in the lower part of the screw head 1a.

This embodiment of the invention has the advantage that not only does it resist loosening of the screw, by the engagement of catch 7 with tooth 8, but also resists rotational movement of the terminal due to the presence of the lower lateral flange 10. Here it should be pointed out that plate 5 can have the parts of lateral lower flanges on both sides to completely angularly immobilize the terminal.

According to the example in FIGS. 3 through 5, which show a connection using a threaded shank 14 that is part of lug 4 and a nut 2 screwing onto the threaded shank 14 and pressing the terminal to lug 4, the plate is fashioned in the form of a washer 6 having a central bore 16 for receiving the threaded shank 14.

According to this embodiment, the catch element 7 comprises at least one spring tab cut out from the washer and folded in the direction of tooth 8, here fashioned in a ring configuration on a lower surface of the nut.

Still using this example, to block washer 6 from rotating in relation to lug 4 and provide a means of stopping rotation of the washer on the threaded shank, the central bore 16 has a tooth 11 that stops rotation, interlocking with a groove 17 of threaded shank 14. A configuration wherein a lower flange element folded from the washer as described in the embodiment in FIG. 1 could also be possible.

Advantageously, to make handling of the device easier and to anchor it, the washer as shown in FIG. 3 is made a part of nut 2 and comprises anchoring arms 15 engaging on a shoulder of a collar 13 of the nut.

As shown in FIG. 4, the arms 15 extend long enough to leave a play J when the nut is not yet screwed on, so as to avoid engagement of catches 7 with tooth 8 at the beginning of the screwing process, which prevents stresses on tooth 11 and excess stress in the screwing process. On the other hand, at the end position in the screwing process, as shown in FIG. 5, the catches 7 are firmly pressed against the teeth and offer good resistance to loosening of the nut.

The device as claimed in the invention therefore prevents any inconvenient loosening of the screw or the nut while allowing voluntary unscrewing by an operator.

The invention is not, of course, limited to the examples shown and its scope shall include alternative versions, in particular the configuration of the plate in FIG. 1 is applicable to a connection device of the nut-threaded shank type by fashioning peripheral teeth on nut 2 similar to the teeth of screw 1.

The invention claimed is:

1. An anti-loosening device for the secure connection of an electrical terminal to a contact lug with a locking member having a tooth element,
    said device comprising a plate having at least one catch element situated between the locking member and the terminal and being rotationally stationary in relation to the contact lug when the locking member is fastened, the catch element engageable with the locking member tooth element to inhibit counter rotation of the locking member.

2. The device as claimed in claim 1, wherein the catch element is operably carried by a supporting member, said supporting member including a base for threadably receiving the rotatable locking member, the supporting member including a stop engageable with the contact lug for inhibiting rotation of the supporting member relative to the contact lug.

3. The device as claimed in claim 1, wherein the rotatable locking member includes a collar, and the tooth member is carried by the collar.

4. The device as claimed in claim 2, wherein the stop comprises a lower lateral flange of the supporting member.

5. The device as claimed in claim 2, wherein the supporting member includes an upper lateral flange, the catch element comprising a nib on the upper lateral flange.

6. The device as claimed in claim 1, wherein the catch element is operably carried by a supporting member, the contact lug including a threaded shank, the locking member comprising a nut, the supporting member comprising a washer receivable by said shank.

7. The device as claimed in claim 6, wherein the washer has anchoring arms, the nut including a collar, the collar including a shoulder, the anchoring arms being engageable with the shoulder.

8. The device as claimed in claim 6, wherein the catch element comprises a least one spring tab cut out from the washer and engage able with a surface of the nut.

9. The device as claimed in claim 6, wherein the washer includes structure defining a central bore and a stop member extending into said central bore, the threaded shank including structure defining a groove for receiving said stop member.

* * * * *